Patented Nov. 18, 1941

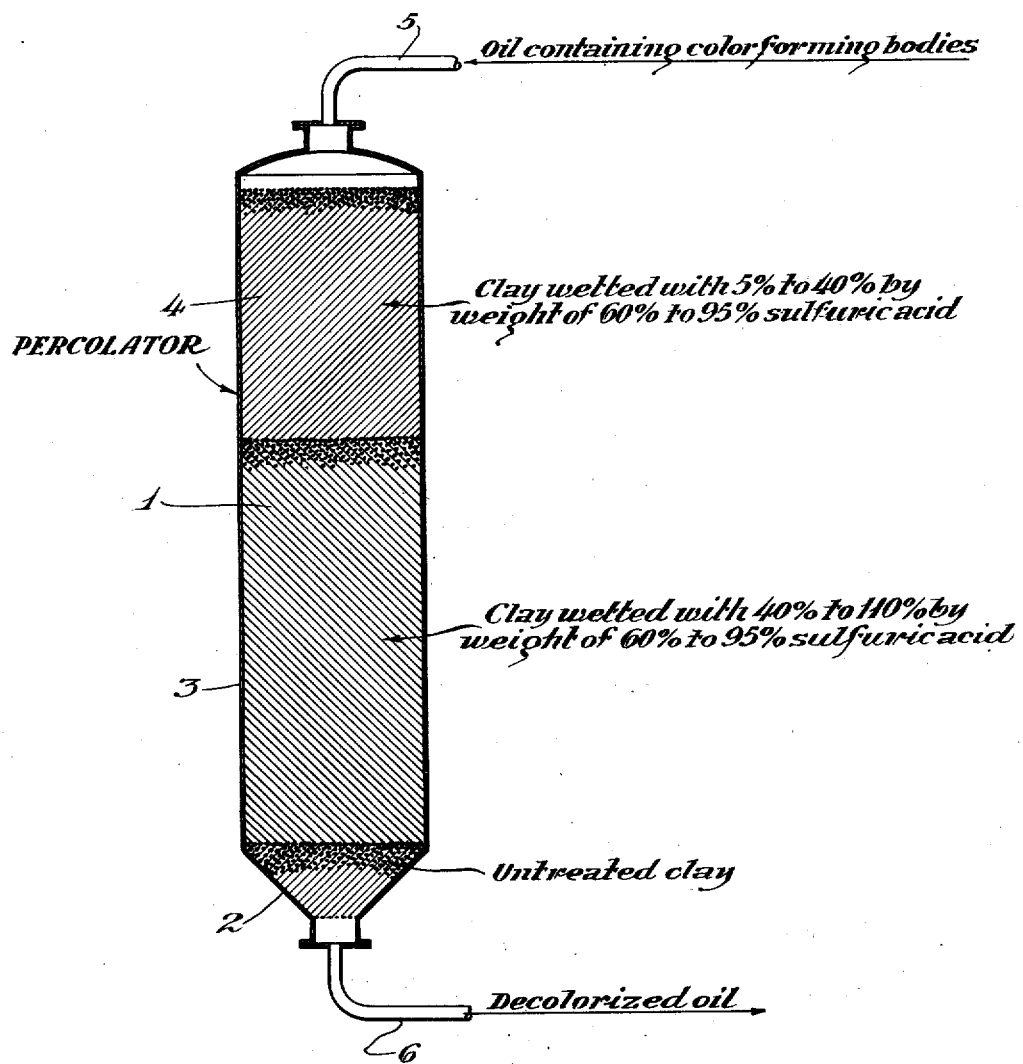

2,263,102

UNITED STATES PATENT OFFICE 2,263,102

DECOLORIZING OIL

Wayne A. Proell, Chicago, Ill., assignor to Standard Oil Company, Chicago, Ill., a corporation of Indiana Application December 15, 1939, Serial No. 309,403

5 Claims. (Cl. 196—40)

This invention relates to improvements in the decolorization of oils and more particularly to improvements in the decolorization of petroleum oils by clay percolation.

In the preparation of finished petroleum oils the petroleum distillate after preliminary treatment with sulfuric acid and/or solvent extraction is percolated through a bed of decolorizing material such as diatomaceous earth, fuller's earth and the like to obtain a final product having the desired color.

I have discovered that greatly improved efficiency and filter yields can be obtained by mixing the filtering clay with from about 40% to about 110% by weight of a mineral acid based on the weight of clay used prior to filtering the oil through the clay. The amount of acid used should not be greater than that required to form a free flowing solid mixture when mixed with the clay. The upper limit of the amount of acid used is the maximum amount which can be mixed with the clay without changing the clay-acid mixture from a free-flowing non-sticky granular mass to a sticky mass or a liquid slurry. For example, using a typical clay—No. 1 burnt Attapulgus clay—the upper limit of added 95% sulfuric acid is about 110% of the weight of the clay. The acid may be concentrated or dilute sulfuric acid, sludge acid obtained from the acid sludge resulting from the treatment of petroleum oil with sulfuric acid, phosphoric acid, or hydrochloric acid. I prefer to use, however, sulfuric acid of from about 60% to about 95% concentration, or sludge acid.

The term "acid-wetted" clay used herein and in the appended claims means a mixture of acid and clay, in which the mixture contains insufficient acid to render it sticky or liquid.

The accompanying drawing illustrates by way of example, a filtration bed having three layers of filtering clay according to the invention.

In preparing the filtration bed I prefer to first place in the bottom of the percolator I a layer 2, comprising up to about 7% of the total depth of the filtration bed, of clay which has not been "wetted" with acid, and then superimpose upon the bottom layer of clay 2 a layer of clay 3 which has been "wetted" with from about 40% to about 110% of its weight of acid. The filtration bed is then finished off by a top layer 4 of acid wetted clay in which the acid content is much less than the middle layer of acid wetted clay; preferably the top layer 4 is a clay wetted with between about 5% and about 40% by weight of the clay used of acid. The percolator I has conventional inlet pipe 5 and outlet pipe 6. The above arrangement of clays is preferred since it minimizes the clogging of the clay column by precipitated color forming bodies and/or asphalts contained in the oil. These materials precipitate slowly and uniformly in the uppermost acid-poor clay layer 4, and rapidly in the middle acid-rich clay layer 3. Since the oil is substantially clean by the time it reaches the middle clay layer 3 it does not clog this clay stratum, and the rate of filtration is not materially affected.

While the foregoing arrangement of the filtration bed is preferred, particularly when oils having a high content of color forming bodies are being percolated, I may dispense with the top layer of acid-poor clay 4 if the oil to be filtered does not have a high content of color forming bodies.

The effectiveness of my improved method is illustrated by the following examples which are exemplary of the invention and not intended to be a limitation thereof.

Example 1

Two parts of Attapulgus clay were mixed with about one part of 60% sulfuric acid to produce a product which was a free flowing granular mixture. A layer of untreated Attapulgus clay was placed in the bottom of a percolation tube and about one-half as much of the treated clay then placed on top of the untreated clay. A Diesel fuel of 8 N. P. A. color was then percolated through the column to produce a finished oil having a color of about 3 to 3½ N. P. A., with a yield equivalent to about 10,000 gallons of oil per ton of clay.

Example 2

One part of Attapulgus clay was mixed with about one and one-half parts of concentrated sulfuric acid, one part of the oil to be filtered, and about three parts of sea sand. The latter material was incorporated to increase the porosity of the mixture. A layer of untreated clay was placed in a percolation tube and about an equal amount of the clay-acid-sand mixture placed on top of the untreated clay. An untreated oil of 8 N. P. A. color was percolated through the tube, and an oil having a color of 1½ to 2 N. P. A., with a yield of about 10,000 gallons of oil per ton of clay was obtained.

Filtering the same oils through untreated clay alone to a yield of about 10,000 gallons of oil per ton of clay, a percolated oil having a 7 N. P. A. color was obtained. Acid treating the oil with concentrated sulfuric acid and then percolating the acid treated oil through an untreated clay resulted in a percolated oil having a color of 4½ N. P. A. with a yield of about 10,000 gallons of oil per ton of clay. A comparison of the results obtained clearly shows the superiority, both from the view point of filtering yields and the final product obtained, of percolating oil through clay having admixed therewith a small amount of acid.

The effectiveness of the present invention is further demonstrated by the following tests:

| Test | Treatment | Color (N. P. A.) |
|---|---|---|
| A | Oil of 8 N. P. A. color treated with 0.5% H₂SO₄, filtered at once through paper, and then clayed (untreated clay) | 4½ |
| B | Same as A, except acid-treated oil was permitted to settle 60 minutes before filtration and clay percolation | 3½ |
| C | Same as A, except acid-treated oil permitted to settle 18 hours before filtration and clay percolation | 2½ |
| D | Oil of 8 N. P. A. color (not acid-treated) percolated through acid-wetted clay | 1½-2 |

(In the above tests all oils were percolated to give yields of 10,000 gallons of oil per ton of clay). The data show the enhanced efficiency obtained when percolating with acid-wetted clays.

Although my invention is applicable to the clay percolation of any oil, it is particularly adaptable to, and most efficient for the clay percolation of oils rich in asphaltenes and in which improvement in color is effected by the removal of such asphaltenes.

A further advantage obtained with my invention is the revivifying effect obtained when applying the invention to spent clays. Clays which have been used for the percolation of oils which apparently have no further decolorizing effect upon the oil being treated, when acid wetted in accordance with my invention are again able to remove coloring matter from oils percolated therethrough without the necessity of burning and/or otherwise revivifying the clay. Thus an oil was percolated through clay until the filtrate had a color of about 8 N. P. A., indicating that the decolorizing power of the clay was exhausted. The exhausted clay was then wetted with concentrated sulfuric acid, in the manner described above, and oil again percolated through the acid-wetted exhausted clay. A filtrate was obtained having a color of 3 N. P. A. with a yield of 10,000 gallons of oil per ton of clay, indicating that the decolorizing efficiency of the spent clay was greatly enhanced simply by acid-wetting the same.

While I have described certain preferred examples of my invention and the manner of carrying out the same, I do not intend to limit myself thereto, since the precise proportions of the materials utilized may be varied without departing from the scope of the invention as defined in the appended claims.

I claim:

1. The method of decolorizing a petroleum oil comprising wetting a decolorizing clay with from about 40% to about 110% by weight of sulfuric acid of from about 60% to about 95% strength and percolating the mineral oil through a bed of the acid-wetted decolorizing clay.

2. The method of removing color forming bodies from a petroleum oil containing the same comprising wetting a decolorizing clay with from about 40% to about 110% by weight of sulfuric acid of from about 60% to about 95% strength, superimposing a substantial layer of the acid-wetted clay upon a layer of untreated decolorizing clay and percolating the mineral oil through said clays.

3. In the decolorization of mineral oils by percolation through fuller's earth the improvement comprising first wetting said fuller's earth with from about 40% to about 110% by weight of sulfuric acid of from about 60% to about 95% strength, and subsequently percolating the mineral oil through said sulfuric acid-wetted fuller's earth.

4. The method of removing color forming bodies from a petroleum oil containing the same comprising percolating the oil through a filtration bed comprising a lowermost layer of a decolorizing clay which has not been acid-wetted, a middle layer of clay wetted with from about 40% to about 110% of a sulfuric acid based on the weight of the clay used, and a top layer of clay wetted with from about 5% to about 40% of a sulfuric acid based on the weight of the clay used, the sulfuric acid in each case having a strength of from about 60% to about 95%.

5. In a process for removing color forming bodies from a petroleum oil the step comprising percolating the oil through a bed of clay wetted with from about 40% to about 110% by weight of sulfuric acid having a strength of from about 60% to about 95%.

WAYNE A. PROELL.